United States Patent [19]

Morrison

[11] 4,177,833

[45] Dec. 11, 1979

[54] VALVES HAVING A PRESSURE EQUALIZER ACROSS DUAL FACE SEALS

[75] Inventor: Bertram L. Morrison, Houston, Tex.

[73] Assignee: ACF Industries, Incorporated, New York, N.Y.

[21] Appl. No.: 924,775

[22] Filed: Jul. 14, 1978

[51] Int. Cl.² .............................................. F16K 11/07
[52] U.S. Cl. ............................... 137/625.12; 137/629; 137/630.12
[58] Field of Search ............... 137/625.12, 629, 630.12

[56] References Cited

U.S. PATENT DOCUMENTS

| 3,035,595 | 5/1962 | Beason | 137/629 X |
| 3,036,600 | 5/1962 | Vickery | 137/625.12 |
| 3,314,448 | 4/1967 | Wolff | 137/629 X |
| 3,534,764 | 10/1970 | Natho | 137/629 X |
| 3,780,982 | 12/1973 | Kemp | 137/625.33 X |

*Primary Examiner*—Harold W. Weakley
*Attorney, Agent, or Firm*—Eugene N. Riddle

[57] ABSTRACT

A valve has upstream and downstream seat assemblies each having a pair of spaced annular face seals in concentric relation to form inner and outer face seals. A movable valve member (26, FIG. 2; 88, FIG. 8) has a main bore therethrough and is mounted in a valve chamber between the seat assemblies for movement between open and closed positions. A pair of auxiliary fluid passageways (72, 74, FIG. 2; 112, 114, FIG. 8) are located in the valve member at opposite ends of the main bore. Each of the auxiliary passageways has its outer end opening to the side of the valve member radially outward of the main bore and an inner end opening into the main bore. Upon opening of the valve the valve member is temporarily positioned so as to locate the outer end of each auxiliary passageway between the associated face seals so fluid can leak past the inner face seal on the upstream seat assembly into the area between the inner and outer seals, thence flow through one auxiliary passageway into the main bore and valve chamber, and then through the other auxiliary passageway to leak past the outer face seal at the downstream seat assembly to the downstream side of the valve. This fluid motion functions to equalize and reduce the pressure differential across the valve before the valve member is moved to the open position with the main bore moving across both face seals of the seat assemblies.

10 Claims, 10 Drawing Figures

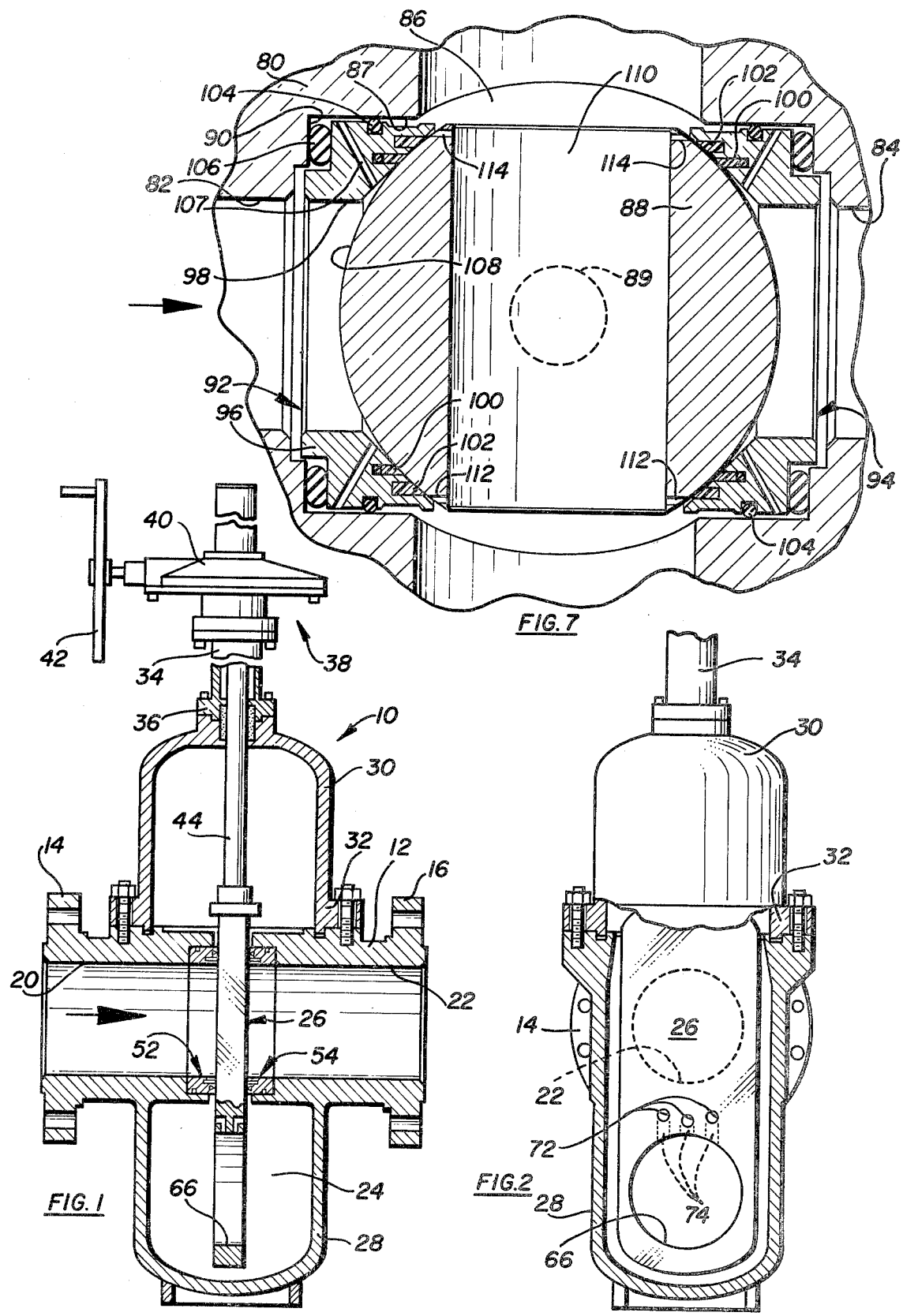

VALVES HAVING A PRESSURE EQUALIZER ACROSS DUAL FACE SEALS

BACKGROUND OF THE INVENTION

This invention is related to valves which are provided with openings that allow fluid communication between the upstream and downstream sides of the valve before any portion of the main opening of the valve passes the seat assemblies in order to equalize pressure across the face seals and prevent damage to them. Heretofore, gate valves and other valves have been provided with a plurality of openings adjacent the main bore which provide an initial restricted flow upon moving the valve member to a partially open position. For example, U.S. Pat. No. 3,036,600 issued May 29, 1962 shows a single seated ball valve in which a series of small openings adjacent the main bore through the ball valve member are employed to provide an initial restricted flow upon opening of the valve which tends to equalize the upstream and downstream pressures across the valve. Also U.S. Pat. No. 3,780,982 issued Dec. 25, 1973, shows a gate valve which has a plurality of small openings through the gate member at the upper portion of the bore to provide an initial restricted flow upon opening of the valve which will tend to equalize upstream and downstream pressures across the valve. In both of these arrangements the full force of the upstream pressure is communicated across the face seals of at least the upstream seat assembly as the valve is initially opened. When there is a substantial initial pressure differential across the face seal, then repeated opening and closing of the valve causes the degradation of the face seal which will eventually result in a permanent leak across the face seal.

SUMMARY OF THE INVENTION

The present invention is directed to a valve structure with upstream and downstream seat assemblies that each have inner and outer face seals in concentric spaced relation to each other. The outer face seal is a soft seal and seals against the face of the valve member at low and high pressures. The inner face seal is a relatively hard seal, such as metal or Teflon and acts as a secondary seal to restrict fluid flow against the outer face seal from the bore of the body. Fluid from the body bore in the closed position of the valve will leak past the inner seal and pressure on opposed sides of the inner seal will equalize. Thus, the inner seal acts as a flow restrictor for the outer soft seal and tends to protect the outer soft seal from large pressure differentials when the valve starts to open as will be explained.

The movable valve member has a main bore therethrough and auxiliary passageways which connect opposite ends of the main bore to sides of the valve member radially outward of the main bore. Each of the auxiliary passageways has an outer end radially outward of the main bore and an inner end which opens into the main bore. The spaced concentric face seals and the auxiliary passageways are so designed that upon opening of the valve the valve member is temporarily positioned to locate the outer end of the auxiliary passageway on the upstream side of the valve between the associated face seals so that fluid from the upstream passageway of the valve can leak past the inner face seal into the area between the inner and outer seals, then through the adjacent auxiliary passageway into the valve member bore and body cavity from the inner side of the outer soft seal, and thereafter through the other auxiliary passageway and past the innermost face seal of the downstream seat assembly into the downstream side of the valve. This temporary positioning of the valve member functions to reduce and equalize the pressure differential across the outer face seal before the valve is opened which has the result of lessening degradation or damage to the face seal as the main bore of the valve member moves into the open position. One embodiment of this invention is directed to a gate valve and another embodiment to a ball valve.

One object of this invention is to provide a valve structure which overcomes the aforementioned disadvantages of the prior art devices by locating auxiliary passageways in the valve member which will function to equalize or substantially reduce the total pressure differential that can exist across all face seals of a valve when it is moved from the closed position to the open position in the presence of a substantial upstream pressure differential.

Still, another object of this invention is to provide a valve structure which has a pair of spaced apart face seals, one of which is designed to leak fluid to the auxiliary passageways in the valve member as it is moved from the closed position to the open position, and wherein the other face seal is designed with the intention of being the primary sealing element.

DESCRIPTION OF THE DRAWINGS

FIG. 1 is a longitudinal sectional view of a gate valve structure of one embodiment of the present invention with the upper portion of the valve being longitudinally shortened and shown in elevation;

FIG. 2 is a partially cutaway elevational view of the gate valve structure shown in FIG. 1 with the upper portion of the valve removed;

FIG. 7 is a cross-sectional fragmentary view of a ball valve embodiment of the present invention with the view taken transversely through a mid-portion of a ball valve;

Figure 3:
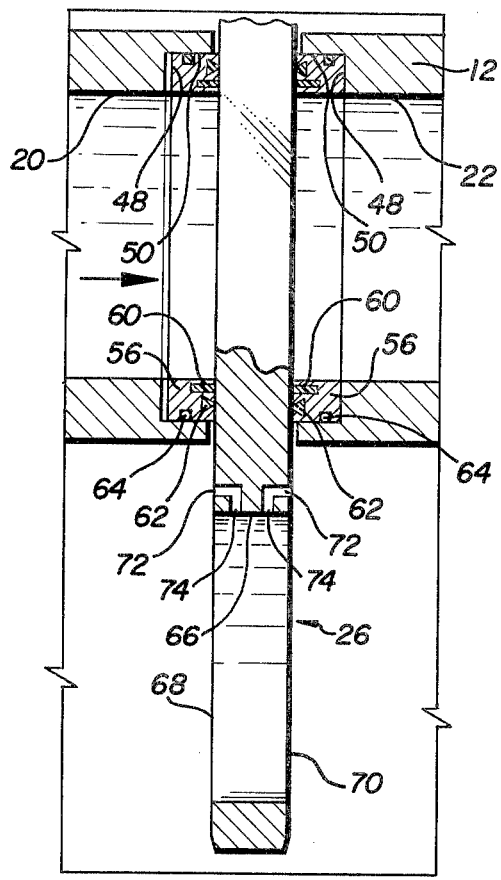
FIG. 3 is an enlarged fragment of the valve shown in FIG. 1 with the gate in a closed position.

The following is a discussion and description of preferred specific embodiments of the valve seat assemblies and valve members specific to this invention, such being made with reference to the drawings whereupon the same reference numerals are used to indicate the same or similar parts and/or structure. It is to be understood that such a discussion and description is not to unduly limit the scope of the invention.

DETAILED DESCRIPTION

Now referring to the drawings for a better understanding of the invention and more particularly to the embodiment of the gate valve shown in FIGS. 1-6, the gate valve structure is indicated generally at 10 and includes a main body 12 with flanges 14 and 16 adjacent opposed ends of main body 12 to permit connection of the valve with suitable pipe connections (not shown). An inlet or upstream flowline or flow passage 20 is provided through one side of body 12 and an outlet or downstream flowline or flow passage 22 is provided through the opposite end of main body 12. A cavity 24 or valve chamber is defined inside main body 12 and intersects flow passages 20 and 22. A gate member, indicated generally at 26, is mounted in valve chamber 24. Body 12 also includes an integral lower housing 28 and a bonnet 30 is mounted on top of main body 12. Bonnet 30 has a lower flange 32 which is secured by a plurality of bolts to body 12. A yoke tube 34 is secured by a flange 36 to the upper portion of bonnet 30. A gear operator indicated generally at 38 is mounted on the upper end of yoke tube 34 and includes a housing 40 which encloses a suitable gear mechanism (not shown). A handwheel 42 is mounted with the gear mechanism that is enclosed in housing 40 and operates the gear mechanism. A gate stem 44 has its lower end connected to gate valve member 26 and its upper end threadedly mounted with the gear mechanism enclosed in housing 40 as is well known in the art so that rotation of handwheel 42 operates the gear mechanism and displaces stem 44 and gate member 26 between open and closed positions.

Now referring to FIGS. 3-6, seat pockets or annular recesses are found in main body 12 around flow passageways 20 and 22 adjacent gate member 26 by annular shoulders 48 and circumferential surfaces 50. Mounted in the seat pockets are an upstream seat assembly indicated at 52 and a downstream seat assembly indicated generally at 54. Each seat assembly 52 and 54 is identical and includes a seat ring 56 having a central bore 58 in alignment with flow passages 20 and 22. Seat assemblies 52 and 54 each have a pair of concentric annular grooves around the front sealing face thereof which receive and mount an inner sealing ring or face seal 60 and an outer sealing ring or face seal 62. Sealing rings 60 and 62 are adapted to engage the adjacent surface of gate member 26 in sealing relation. Inner seal ring 60 is preferably constructed of a material which is harder than the material from which outer sealing ring 62 is constructed. Outer seal ring 62 is intended as the primary seal and inner seal ring 60 is intended as a secondary seal. Inner sealing ring 60 is intended to leak under normal flowline pressure for specific purposes to be described below. Another annular groove is provided around the outer circumferential surface of each seat ring 56 to receive O-ring 64 which seals against seat pocket circumferential surface 50. The seat pockets are sufficiently long to permit a limited travel of the associated seat members. On the upstream side of the valve, flowline fluid pressure displaces seat ring 56 in the downstream direction. Fluid pressure acting on the back face of seat ring 56 is retained by O-ring 64 which urges the seat ring in the downstream direction against gate member 26 when the valve is in the closed position as shown in FIGS. 1 and 3. It is to be noted that O-ring 64 is of a larger diameter than outer face sealing ring 62, thus providing a piston effect on the upstream seat assembly when gate member 26 is in the closed position.

Figure 6:
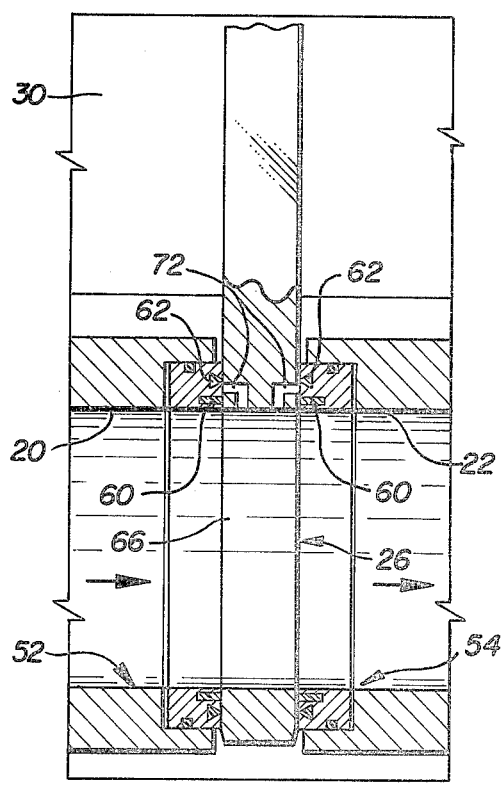
FIG. 6 is an enlarged fragment of the valve shown in FIG. 1 with the valve member in the fully open position.

Gate member 26 performs an important part of the present invention and such includes a parallel sided gate member with a main bore 66 adapted to be aligned with flow passages 20 and 22 when the gate valve member is in the full open position as shown in FIG. 6. Main bore 66 is formed through the lower portion of gate member 26. Gate member 26 has substantially flat and parallel side surfaces 68 and 70 which move adjacent to the front faces of seat assemblies 52 and 54. A pair of auxiliary passageways are arranged through gate member 26 at the upper portion of main bore 66, with one of the passages connecting upstream side surface 68 with main bore 66 and the other passageway connecting downstream side surface 70 with main bore 66. Each of the passageways is identical and includes a transverse portion 72 joining the respective side surface of gate member 26 and a radially disposed portion 74 connecting transverse portion 72 to main bore 66.

Figure 4:
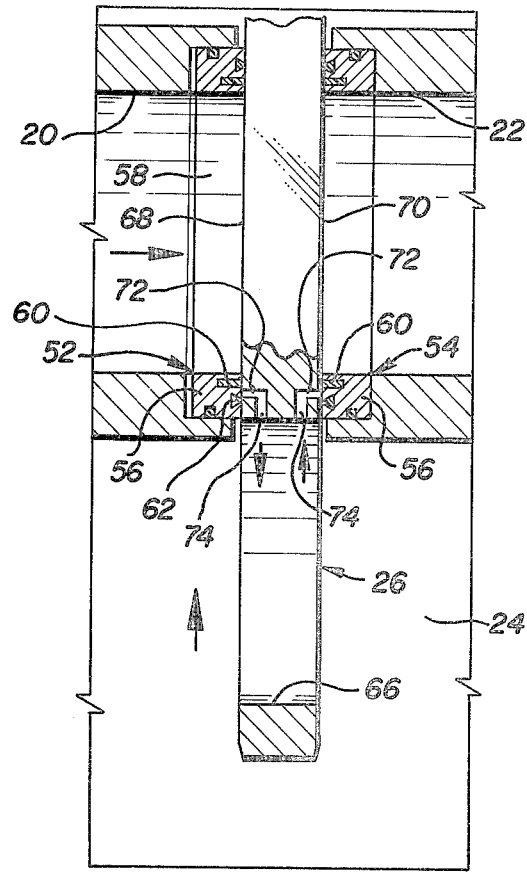
FIG. 4 is an enlarged fragment of the valve shown in FIG. 1 illustrating the gate in the temporary location wherein the auxiliary passageways are positioned between the face seal rings.

A plurality of these auxiliary passageways are provided through gate member 26 in a staggered spaced relation about the upper portion of main bore 66. FIG. 2 shows a plurality of the auxiliary passageways through gate member 26. The transverse portions 72 of these auxiliary passageways are arranged so their openings with gate side surfaces 68 and 70 will lie in alignment between face seals 60 and 62 when gate 26 is moved toward the open position. As gate member 26 moves toward the open position from the closed position shown in FIG. 3, it assumes a temporary location as shown in FIG. 4 wherein auxiliary passageway transverse portion 72 is positioned between face seals 60 and 62. These auxiliary passageways are carefully arranged so the transverse portions 72 thereof will lie between the associated face seals when gate member 26 is in this temporary position. The auxiliary passageways are sized so that the flow area thereof is greater than the leakage flow area past the inner face seals 60.

When gate member 26 is in the closed position, fluid leaks past inner face seal 60 which is formed from a relatively hard material into the area between seals 60 and 62. When gate member 26 starts to open and is in the temporary position as shown in FIG. 4, fluid from upstream passageway 20 leaks past the inner face seal 60 and gate upstream side surface 68 and flows through the auxiliary passageway into valve chamber 24 because fluid pressure in upstream passageway 20 is normally substantially greater than fluid pressure in valve chamber 24. When fluid pressure in valve chamber 24 becomes substantially greater than fluid pressure in downstream fluid passageway 22, then fluid will flow through the other auxiliary passageway on the downstream side of gate member 26 and past inner face seal 60 at downstream side surface 70 into downstream fluid passageway 22. The overall result of the fluid flowing through the valve when it is in this temporary position is to reduce the pressure differential across the valve which has the result of reducing the pressure differential that will act particularly on face seals 62 when the valve is initially opened. Face seals 60 control the leakage or flow of fluid to outer face seals 62 which are formed of a soft elastomeric or rubberlike material. When the valve is initially opened, main bore 66 moves over or passes outer face seal 62 thereby exposing a small portion of the face seal to the pressure differential between upstream flow passageway 20 and downstream flow passageway 22. Because fluid has been allowed to flow through the valve via the auxiliary passageways the gross pressure differential across the valve is less than it would be if such flow was not allowed.

Figure 5:
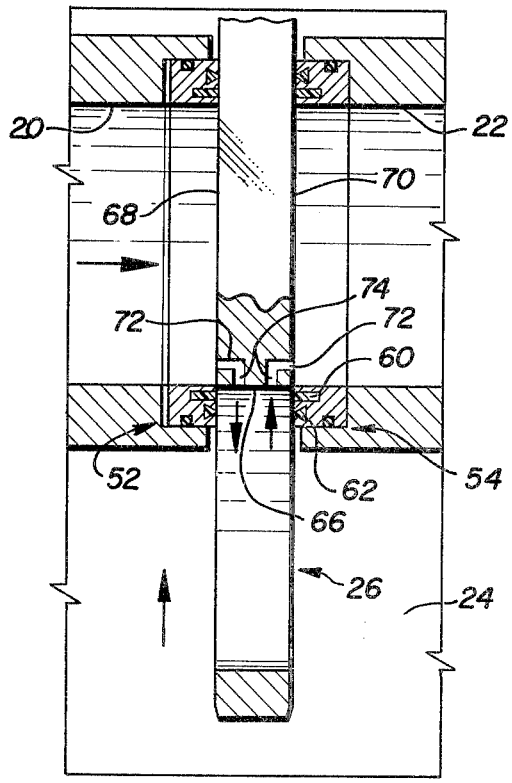
FIG. 5 is an enlarged fragment of the valve shown in FIG. 1 with the gate in a partially open position wherein the main bore is displaced just past a lower edge portion of both face seals.

FIG. 5 shows gate member 26 positioned with main bore 66 having the upper portion thereof displaced just inwardly beyond face seals 60 and 62 which is the location that typically creates the most damaging effect for the face seals because of the high fluid pressure differential across gate member 26 that results in a relatively high flow rate exposed to the faces of the seals. At this time the auxiliary passageways function to provide a fluid flow as indicated by the small arrows in FIG. 5. This fluid flow through the auxiliary passageways and valve chamber 24 reduces the overall pressure differential across the gate member by providing a flow path which does not traverse the sealing surface of the face seals. The gate member is left in this temporary position for a relatively short period of time in order to equalize the pressure across the valves. When gate member 26 is moved upwardly from the position shown in FIG. 5, fluid begins to flow through main bore 66 at a much greater flow rate as the opening between flow passageways 20 and 22 is substantially increased by upward motion of the gate.

FIG. 6 shows gate member 26 in the fully opened position with main bore 66 in alignment with fluid passageways 20 and 22. When gate member 26 is in the fully open position, the transverse portions 72 of the auxiliary passageways are positioned between face seals 60 and 62. With the auxiliary passageways in this location, the outer face seal 62 can maintain a primary seal around the main bore at a location which is outward of the auxiliary passageways.

When gate member 26 is moved from open position to closed position, the auxiliary passageways function to pass the fluid from upstream passageway 20 to downstream passageway 22 as gate member 26 is positioned in the nearly closed position shown in FIG. 5. Also, fluid can leak past inner face seal 60 and through the passageways as described above when the flow passageways are located as shown in FIG. 4. Gate member 26 completely covers inner face seal 60 while the upstream fluid pressure is being relieved through the auxiliary passageways into valve chamber 24. Outer face seal 62 is exposed to full upstream pressure only after the auxiliary passageways pass outer face seal 62.

Referring now to FIGS. 7-10, a ball valve embodiment of this invention is illustrated in which a ball valve includes a valve body 80 which has an inlet flow passageway 82, an outlet flow passageway 84, and a valve chamber 86 which encloses a ball valve member 88. The inlet and outlet passageways 82 and 84 extend through valve body 80 to inlet and outlet ports of the valve (not shown) for connection with a suitable fluid carrying conduit. Seat pockets are formed in valve body 80 around fluid passageways 82 and 84 at their juncture with valve chamber 86. Both seat pockets are identical with each other including an annular circumferential outer surface 87 and a stepped annular shoulder or bottom 90. Mounted in the seat pockets of the associated flow passageways are an upstream seat assembly indicated generally at 92 and a downstream seat assembly indicated generally at 94.

Each seat assembly is identical and includes an annular seat member 96 with a bore 98 therethrough in alignment with the associated flow passageway. Each seat assembly 92,94 has a pair of concentric grooves in the front face thereof mounting an inner annular face seal 100 and an outer annular face seal 102 in concentric relation which are adapted to sealingly engage ball valve member 88. A groove around the outer circumference of the seat ring receives O-ring 104 to seal between the outer perimeter of the associated seal assembly and valve body 90. The back face of each seat assembly is provided with a stepped portion complementary to opposed bottom 90 which receives an O-ring 106. O-ring 106 is squeezed between seat pocket bottom 90 and the seat assembly back face which causes the associated seat assembly to be urged into engagement with ball valve member 88. Ball valve member 88 has an essentially spherical outer surface 108 and a central bore 110 connecting its opposite sides.

Figure 10:
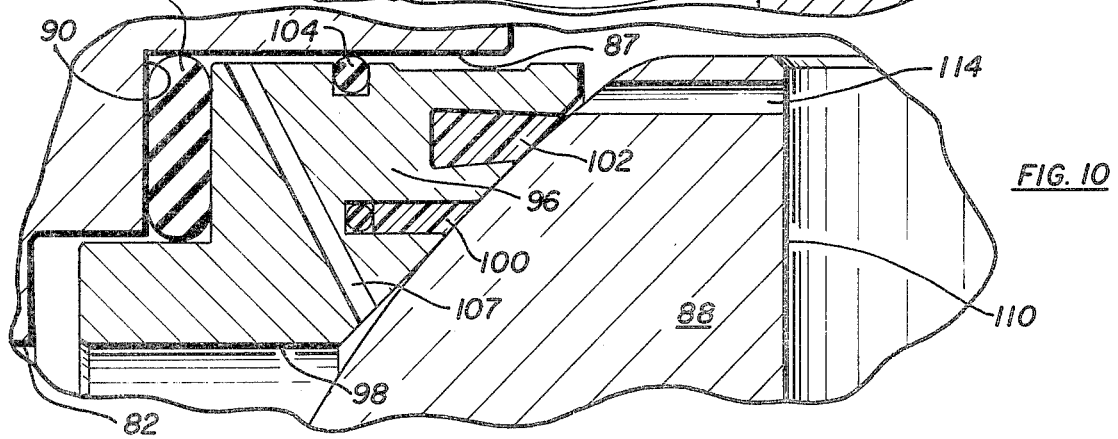
FIG. 10 is an enlarged cross-sectional view of a portion of one seat assembly and a portion of the ball valve member taken from FIG. 7.

A plurality of auxiliary passageways 112 and 114 are provided through ball valve member from spherical surface 108 to bore 110. The auxiliary flow passageways 112 are located at one end portion of bore 110 and extend generally radially outward from bore 110 in opposed relation to what is the leading and the trailing edges of bore 110 as ball valve member 88 is rotated on its trunnion shaft 89 relative to an edge of seat bore 98. Auxiliary passageways 114 are positioned in a similar orientation at the opposite end of bore 110. All of the auxiliary passageways are located such that they lie outside the outer perimeter of outer face seal 102 when ball valve member 88 is in the closed position as shown in FIGS. 7 and 10. In the closed position of valve member 88 shown in FIG. 7, fluid will leak from the upstream side past inner seal 100 as inner seal 100 acts primarily as a flow restrictor and protects outer seal 102 from uncontrolled fluid flow.

Figure 8:
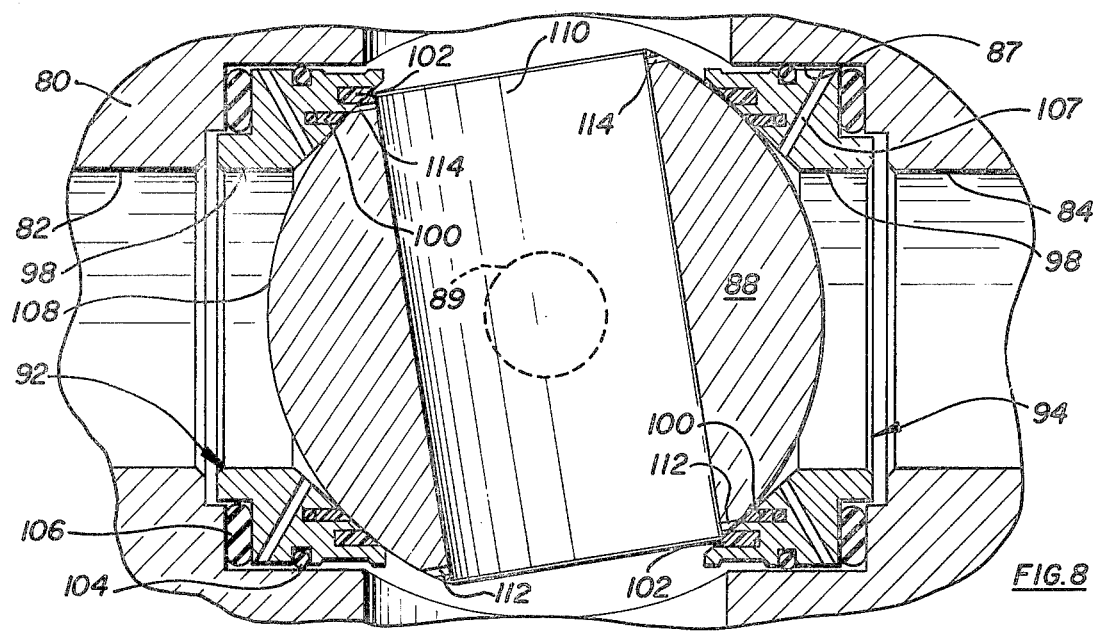
FIG. 8 is a cross-sectional fragmentary view of the ball valve shown in FIG. 7 with the ball valve member shown in the location wherein the auxiliary passageways are positioned between the face seals.

FIG. 8 shows ball valve member 88 in a temporary position with the cooperating pair of leading auxiliary passageways 112 and 114 positioned so their juncture with spherical surface 108 lies between annular face seals 100 and 102. When ball valve member 88 is in this temporary position, fluid in upstream passageway 82 will leak past inner face seal 100, through auxiliary passageway 114, then through ball valve bore 110 and leading auxiliary passageway 112, then leak past the adjacent inner face seal 100 into the downstream flow passageway 84. This flow of fluid from upstream passageway 82 to downstream passageway 84 lessens the overall or gross pressure differential across the valve and thereby lessens the pressure differential across the face seals on the upstream side of the valve. This reduction in pressure differential has the same effect as described above on the face seals of the valve.

Figure 9:
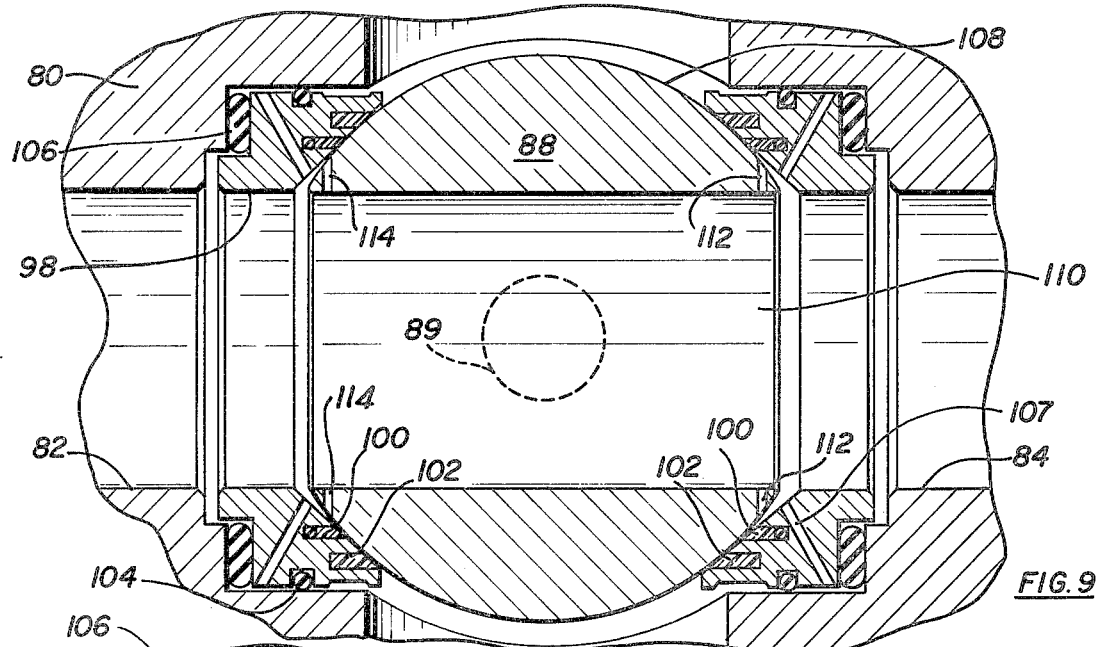
FIG. 9 is a cross-sectional fragmentary view of the ball valve similar to FIG. 7 wherein the ball valve member is shown in the fully open position.

When ball valve member 88 is moved into the open position, auxiliary passageways 112 and 114 are positioned as shown in FIG. 9 relative to the seat face seals. When ball valve member 88 is in the open position the auxiliary passageways have no effect on the operation of the valve and the face seals maintain a sealing contact with spherical exterior surface 108. When ball valve member 88 is moved from the open position to the closed position, the other pair of auxiliary passageways 112 and 114, which was the trailing pair when valve member 88 was moved from closed position to open position and is now the leading pair, will move past the adjacent inner face seals 100 as the valve member approaches the nearly closed position. At this time fluid from the upstream flow passageway 82 can leak past face seal 100 of the upstream seat assembly 92 and through valve bore to the auxiliary passageway on the other side of the valve member where it will leak past the inner face seal of the downstream seat assembly 94 and into downstream flow passageway 84 thereby permitting a gradual change of the pressure differential across the valve member. The function of the auxiliary flow passageways upon closing the ball valve member is of secondary importance because generally the pressure differential will not be as great across the ball valve when moving to the closed position because of residual pressure in the downstream flowline from the valve.

The inner face seals in both of the embodiments are formed of a relatively hard material, such as metal or Teflon, and are not easily displaced from their receiving grooves. The outer face seals in both embodiments are formed of relatively soft material, such as elatomeric or rubber-like materials, and at times under certain conditions are subject to displacement from their receiving groove or to blowing out. Normally this occurs when a large pressure differential is provided on opposite sides of the outer face seals. The inner face seals retrict the fluid flow into the area between the inner and outer face seal while the auxiliary passageways assist in a reduction of the pressure differential across the outer face seals upon the initial movement of the valve member from a closed position.

What is claimed is:

1. A valve structure comprising:

a valve body having a flow passage therethrough and a valve chamber therein intersecting the flow passage, a valve member mounted within the valve body for movement between open and closed positions and having a main bore therethrough adapted to align with the flow passage in the open position;

an annular upstream seat assembly on one side of the valve member about the inlet to the valve chamber and an annular downstream seat assembly on the other side of the valve member about the outlet from the valve chamber, said seat assemblies each having a pair of spaced concentric face seals adapted to engage against the exterior sealing surfaces of the valve member;

said valve member having at least a pair of cooperating auxiliary pressure relieving passageways adjacent opposite ends of the bore extending from the bore through the valve member to the exterior sealing surface thereof adjacent the leading side of the valve member as the valve member is moved from closed position to open position, one of the auxiliary passageways being an upstream auxiliary passageway positioned adjacent the upstream seat assembly and the other auxiliary passageway being a downstream auxiliary passageway positioned adjacent the downstream seat assembly in the closed position of the valve member;

said valve member during initial movement from closed position to open position temporarily positioning the auxiliary passageways between the concentric face seals of the respective associated adjacent seat assemblies permitting fluid to pass from the inlet by leaking past the inner face seal of said upstream seat assembly through the upstream auxiliary passageway into the bore, and then passing from the bore into the downstream auxiliary passageway and leaking past the inner face seal of said downstream seat assembly into the outlet;

said auxiliary passageways and said face seals being effective to reduce the overall pressure differential between the upstream and downstream seat assemblies when said valve member is initially moved from the closed position.

2. The valve structure as set forth in claim 1 wherein said inner face seal is formed of a relatively hard material and permits the leakage of upstream fluid into the area between the inner and outer seals in the closed position of the valve member.

3. The valve structure of claim 1 wherein said valve member is an elongated gate valve member with generally parallel sides forming sealing surfaces and a bore through a lower end portion thereof, said gate valve member having said pair of auxiliary passageways located at an upper portion of said bore, and means to reciprocate the gate valve member between open and closed positions.

4. The valve structure of claim 1 wherein said valve member is a ball valve member having an outer spherical sealing surface and a central bore therethrough, and means to rotate the ball valve member between open and closed positions.

5. A valve structure comprising:

a valve body having a flow passage therethrough and a valve chamber therein intersecting the flow passage, a valve member mounted within the valve body for movement between open and closed positions and having a main bore therethrough adapted to align with the flow passage in the open position;

an annular upstream seat assembly on one side of the valve member about the inlet to the valve chamber and an annular downstream seat assembly on the other side of the valve member about the outlet from the valve chamber, said seat assemblies each having a pair of spaced concentric face seals adapted to engage against the adjacent exterior sealing surfaces of the valve member;

said valve member having two cooperating pairs of auxiliary pressure relieving passageways adjacent opposite ends of the bore extending from the bore through the valve member to the exterior sealing surface, one of said cooperating pair being adjacent the leading side of the valve member and the other of said cooperating pairs being positioned adjacent the trailing side of the valve member as the valve member is moved from closed position to open position, one of the auxiliary passageways of each pair being positioned adjacent the upstream seat assembly and the other auxiliary passageway being positioned adjacent the downstream seat assembly in the closed position of the valve member;

said valve member during initial movement from closed position to open position temporarily positioning said one pair of auxiliary passageways between the concentric face seals of the respective associated adjacent seat assemblies permitting fluid to pass from the inlet by leaking past the inner face seal of said upstream seat assembly through the upstream auxiliary passageway into the bore, and then passing from the bore into the downstream auxiliary passageway and leaking past the inner face seal of said downstream seat assembly into the outlet;

said valve member during initial movement from open position to closed position temporarily positioning said other pair of auxiliary passageways between the concentric face seals of the respective associated adjacent seat assemblies permitting fluid to pass from the inlet by leaking past the inner face seal of said upstream seat assembly through the upstream auxiliary passageway into the bore, and then passing from the bore into the downstream auxiliary passageway and leaking past the inner face seal of said downstream seat assembly into the outlet;

said two cooperating pairs of auxiliary passageways being effective to reduce the pressure differential between the upstream and downstream seat assemblies when the valve member is initially moved from either closed or open positions.

6. The valve structure of claim 5 wherein said valve member is a ball valve member having an outer spherical sealing surface and a central bore therethrough, and means to rotate the ball valve member between open and closed positions.

7. The valve structure of claim 6 wherein all of auxiliary passageways are positioned inwardly of the inner face seals in the full open position of the ball valve member and are positioned outwardly of the outer face seals in the full closed positions of the ball valve member.

8. A valve structure comprising:
a valve body having a flow passage therethrough and a valve chamber therein intersecting the flow passage, a valve member mounted within the valve body for movement between open and closed positions and having a main bore therethrough adapted to align with the flow passage in the open position;

an annular upstream seat assembly on the upstream side of the valve member about the inlet to the valve chamber having inner and outer spaced concentric face seals adapted to engage against the exterior sealing surfaces of the valve member, said inner face seal being of a relatively hard material and said outer face seal being of a relatively soft elastomeric material, said inner face seal in the closed position of the valve member permitting leakage of upstream fluid pressure into the area between the inner and outer seals;

said valve member having an auxiliary pressure relieving passageway extending from the bore through the valve member to the exterior sealing surface thereof adjacent the leading side of the valve member as the valve member is moved from closed position to open position, said valve member during initial movement from closed position to open position temporarily positioning the auxiliary passageway between the concentric face seals and permitting fluid to pass from the inlet by leaking past the inner face seal of said upstream seat assembly through the auxiliary passageway into the bore and the valve chamber.

9. The valve structure as set forth in claim 8 wherein said seat assembly comprises a metal seal ring having a pair of concentric grooves therein for receiving the inner and outer face seals.

10. The valve structure as set forth in claim 9 wherein said seat assembly is mounted for free floating back and forth movement relative to the valve body;

and resilient means between the body and seat assembly urges continuously the seat assembly toward the valve member.

* * * * *